Sept. 6, 1966 J. E. HICKERSON 3,270,958

MECHANICAL CALCULATING APPARATUS

Filed Oct. 27, 1964

4 Sheets-Sheet 1

INVENTOR.
JOHN E. HICKERSON

BY Homer L. Kneal

AGENT.

Sept. 6, 1966 J. E. HICKERSON 3,270,958

MECHANICAL CALCULATING APPARATUS

Filed Oct. 27, 1964

4 Sheets-Sheet 2

Sept. 6, 1966 J. E. HICKERSON 3,270,958
MECHANICAL CALCULATING APPARATUS
Filed Oct. 27, 1964 4 Sheets-Sheet 4

United States Patent Office 3,270,958

Patented Sept. 6, 1966

3,270,958
MECHANICAL CALCULATING APPARATUS

John E. Hickerson, Lexington, Ky., assignor to International Business Machines Corporation, New York, N.Y., a corporation of New York Filed Oct. 27, 1964, Ser. No. 406,842
11 Claims. (Cl. 235—61)

This invention relates to mechanical calculating apparatus and more particularly to slides for performing arithmetic operations in mechanical calculating machines.

In the past, the arithmetic operations of addition, subtraction, and multiplication in mechanical calculating machines have been accomplished with bulky, complex, and sluggish mechanical structure. The cumbersome mechanical movements in the prior art mechanical calculators occur predominantly in the means to select or position an operational member for read-out. The positioning or selection of this operational member is controlled by the operands in the arithmetic operation.

Generally, two mechanical steps have been required in prior art calculators to position an operational member to represent two operands. First the operational member must be positioned according to the first operand; thereafter, it must be more accurately positioned in accordance with the combination of the first operand with the second operand. These two mechanical movements have involved the cumbersome mechanical structure responsible for the bulky appearance and sluggish performance of mechanical calculators.

One type of cumbersome mechanical calculator utilizes a rack and pinion operation. First, the rack is moved to select a pinion which represents one of the operands in the arithmetic operation. After selecting the pinion, the rack is moved so as to rotate the pinion. This second movement positions the pinion in accordance with the combination of the two operands in the arithmetic operation. When in a position consistent with the two operands, the pinion will indicate the arithmetic result of the calculation with the two operands.

Another type of cumbersome mechanical calculator utilizes a bar-and-detent plate operation. In this case a first mechanical movement positions a number of detent plates in proximity to a sense bar. This first movement is controlled by one of the operands in the desired arithmetic calculation. The second mechanical movement controlled by the second operand in the calculation positions one of the previously positioned detent plates nearer the sense bar. The periphery of the positioned detent plate may be coded and sensed by the sense bar. The depth of penetration into the plate by the sense bar represents the arithmetic result of a calculation on the two operands.

It is apparent from these two examples that the real problem in mechanical calculators is how to minimize mechanical structure and movement required to position an operational member for read-out.

It is an object of this invention to greatly reduce and simplify the mechanical movement required to position an operational member for read-out in a mechanical calculating machine.

It is a further object of this invention to provide an improved mechanical means for positioning an operational member representative of the combination of a plurality of operands.

It is another object of this invention to perform plural ordered operations on given operands with only one selection of an operational member representative of the operands.

It is another object of this invention to provide an improved mechanical means for performing ordered operations on a plurality of operands.

It is another object of this invention to provide an improved means for selecting operational members which is small in size and requires a minimum of mechanical movement.

It is another object of this invention to provide improved mechanical means for performing arithmetic operations.

It is another object of this invention to perform all the arithmetic operations of multiplication, addition, and subtraction on given operands with only one selection of an operational member representative of the operands.

It is another object of this invention to perform arithmetic operations with a minimum of mechanical movement by means of slides.

In accordance with this invention the above objects are accomplished by one-dimensional motion of groups of slides, each slide containing a pattern of perforations. The slides are superposed on each other so that they may be actively positioned to form passageways via their perforations. Slides in a group are moved to an active position according to an operand assigned to that group. With the slides in active position, a group pattern of perforations in each group of slides establishes a set of passageways through the slides in that group. The set of passageways in each group relates to the other sets of passageways in the other groups in such a manner that only one passageway is formed through all of the groups of slides. After the slides are moved to an active position, pins are dropped into the perforations in the slides. One pin aligned with the passageway through the slides is passed entirely through the groups of slides. This pin is the operational member which represents the combination of given operands.

In another aspect of this invention, a read-out group of slides is provided in combination with the above groups of read-in slides. The combination may perform arithmetic calculations or any ordered operation. Each slide in this read-out group contains two sizes of perforation; the pin passed by the read-in slides penetrates all of the read-out slides. Read-out slides which are penetrated at a small perforation are held fixed, while read-out slides penetrated at a large perforation will be permitted to slide. Those read-out slides which slide indicate the result of the arithmetic calculation or ordered operation on the given combination of operands.

In another aspect of the invention the read-out group of slides is split into three sets for the respective operations of multiplication, addition, and subtraction. Read-out of the arithmetic calculations for each of these operations on the combination of given operands may be simultaneous or serial. Simultaneous operation is achieved by permitting all the sets of read-out slides to operate at the same time. Serial operation can be achieved by providing stop keys which restrain two sets of read-out slides while the remaining third set is permitted to slide.

My invention is simple in structure and in operation. The movement of parts is kept to a minimum. The speed of execution is increased due to the small number of moving parts and the short distance of movement. Furthermore, since the operational member selected by the operands represents only the combination of operands and not the results of an operation on them, many operations can be performed on a single operational member without having to initiate a new input for each change in operation. Finally, the apparatus is more economical to build and more reliable.

The foregoing and other objects, features, and advantages of the invention will be apparent from the following more particular description of a preferred embodiment of the invention, as illustrated in the accompanying drawings.

Figure 4A:
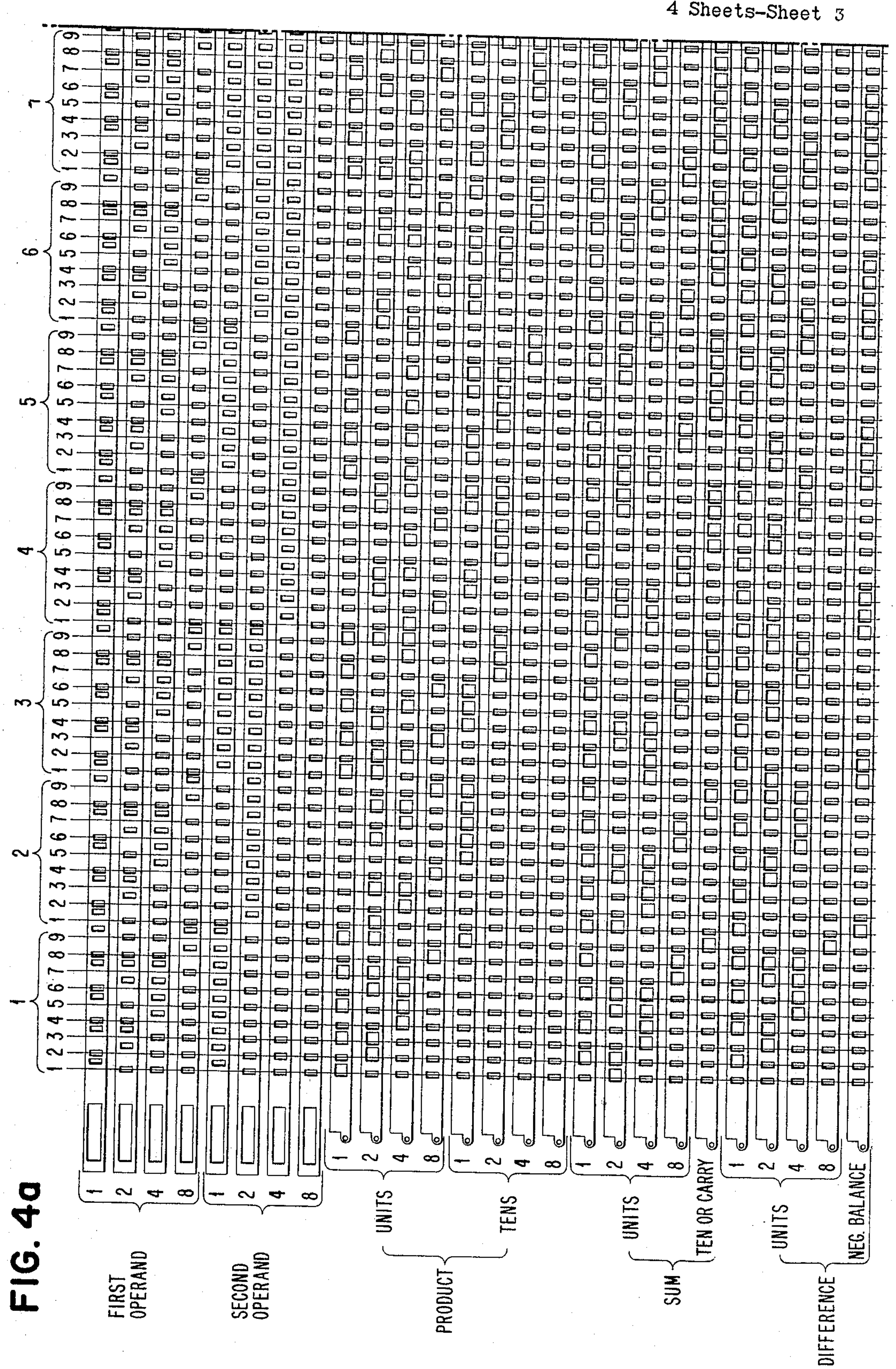
Figure 4B:
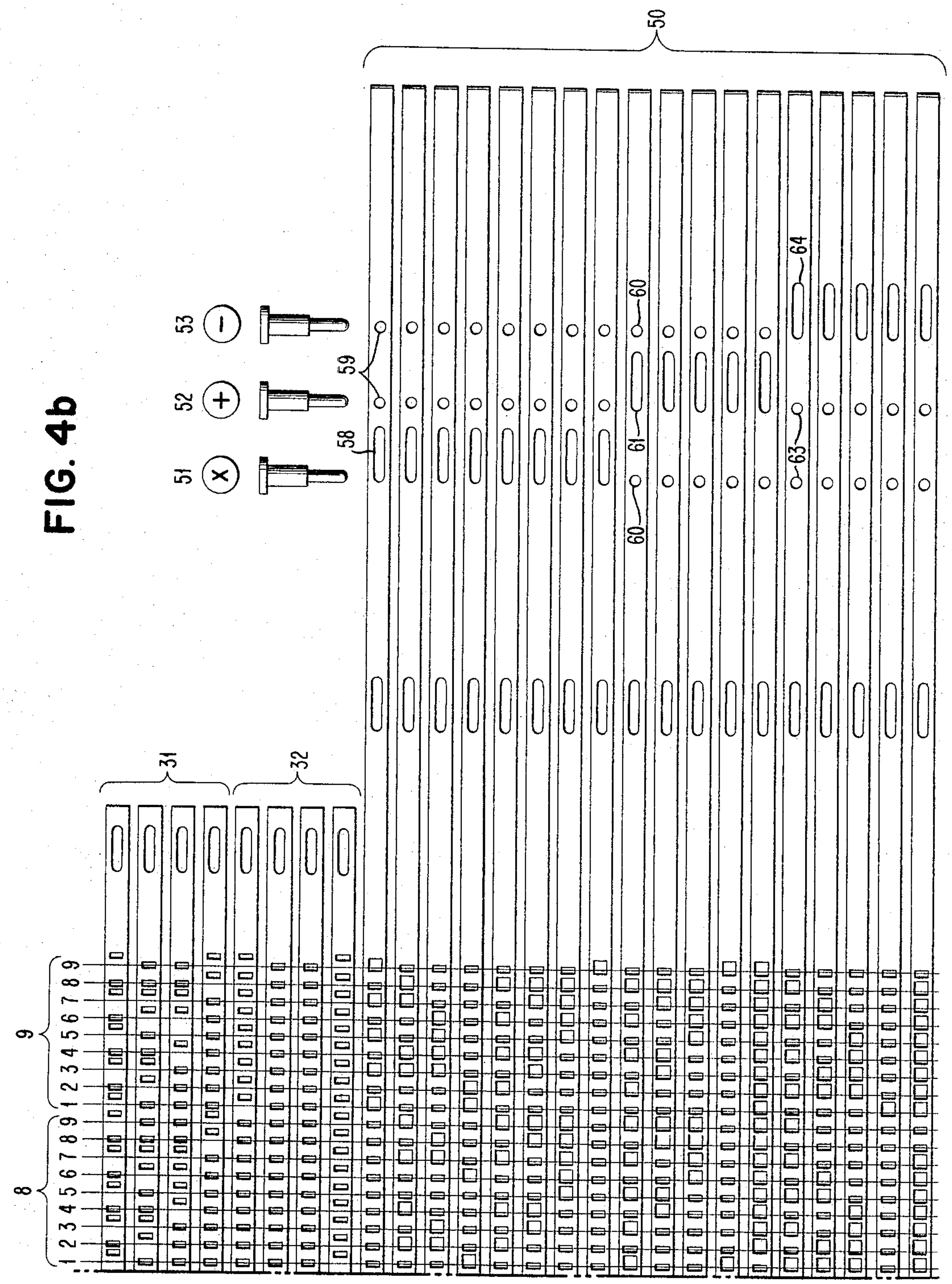

FIGS. 4*a* and 4*b* form a complete diagram of the pattern of perforations in the three groups of slides in the preferred embodiment with the slides turned on edge so as to display the perforations.

*General description*

Figures 1, 3:
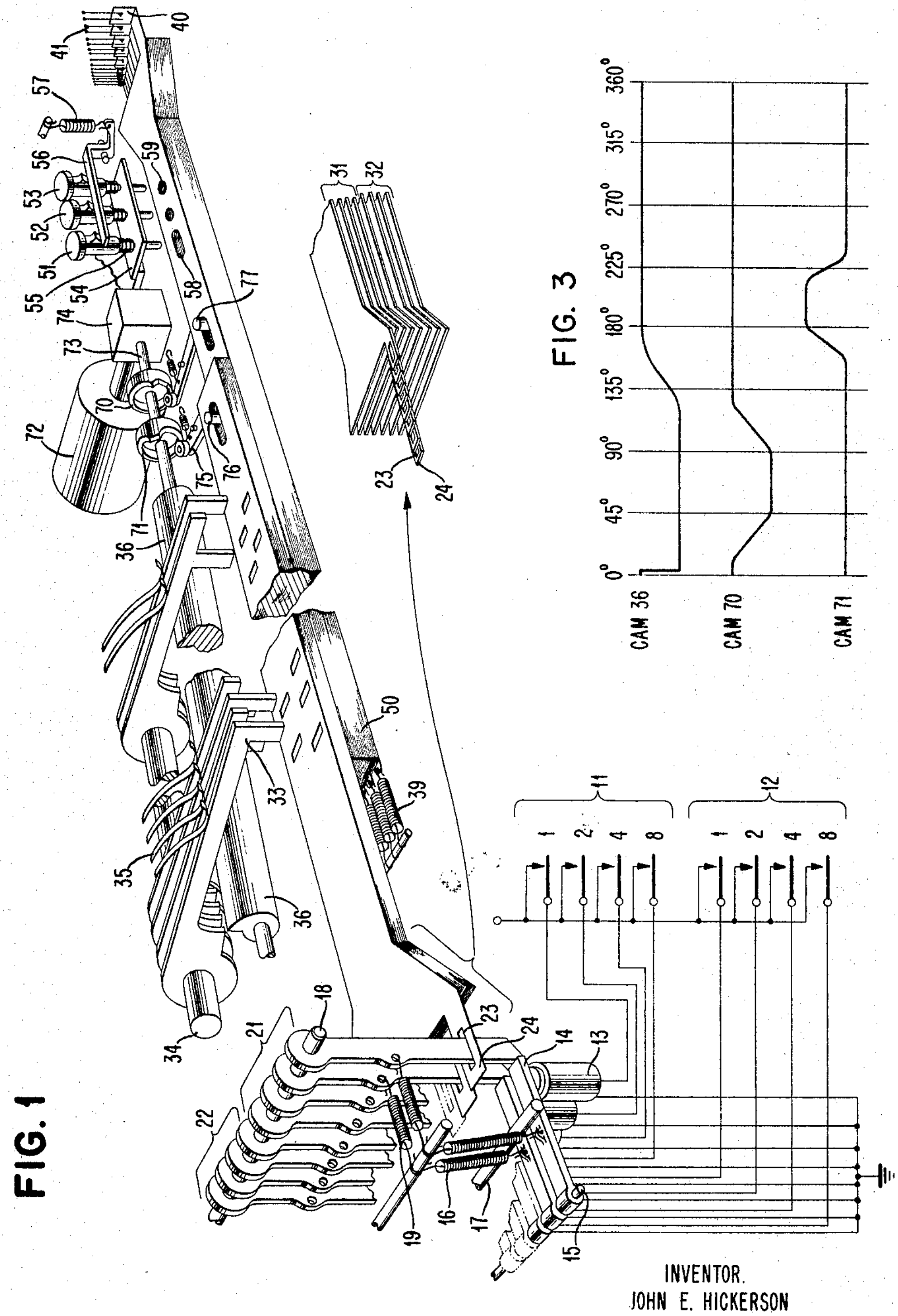
FIG. 1 shows the preferred embodiment of the invention with means to perform read-in, read-out and reset operations.
FIG. 3 is a time chart showing one cycle of operation for the cam surfaces in the preferred embodiment.

In order to give a general description of the preferred embodiment of the invention, reference is made to FIG. 1. A more detailed description of FIG. 1 follows this general description. A first group of read-in slides 31 for a first operand is shown with the slides in inactive position. Slides of this first read-in group may be moved to an active position by levers 21 so that the group pattern of perforations in the group of read-in slides 31 will form a set of passageways. Similarly, a second group of read-in slides 32 is shown with the slides also in inactive position. Slides of this second group may be moved to an active position by levers 22 so that the group pattern of perforations in the group of slides 32 will form a second set of passageways.

After selected slides of the first and second group have been moved to an active position, stop pins 33 are passed into the slides. Those stop pins consistent with the character of the first operand will be passed via the first set of passageways through the first group of read-in slides 31. One of the passageways in the second group of read-in slides 32 will be aligned with one of the pins passed by the first set of passageways. Only this single stop pin will be passed through the second group of read-in slides 32. This stop pin represents the combination of characters in the given operands.

After passing through the two groups of read-in slides, the single stop pin passes into a group of read-out slides 50. Read-out slides 50 contain perforations of two sizes as may be seen in FIGS. 4*a* and 4*b*. Any pin passing through the two groups of read-in slides will always pass into all of the read-out slides. Those read-out slides which have a small opening to pass the stop pin will be frozen inactive by the stop pin. Those read-out slides which have a large opening to pass the stop pin will be free to move a limited amount to the left. After the stop pin is in position, the read-out slides 50 are released so that those slides which can move are pulled to the left by springs 39 shown in FIG. 1. Those slides 50 which move to the left will bring their tabs 40 against relay contacts 41. The pattern of relay contacts which close indicates the result of the arithmetic operation on the two operands.

*Read-in mechanism*

Referring to FIG. 1 in more detail, a preferred read-in mechanism is shown in the left-hand portion of that figure. In order to move the slides in each group of read-in slides to an active position, two groups of read-in keys 11 and 12 are provided. The keys in group 11 are associated with a first operand and control levers 21 and slides 31. The keys in group 12 are similarly associated with a second operand and control levers 22 and slides 32. Each key in the two groups is effective to operate its own solenoid 13. When operative, a solenoid 13 attracts a bar 14 placed in immediate proximity to it. Bars 14 are rotatably mounted on shaft 15 and are spring biased by springs 16 upward against restraining member 17. When the bars 14 are resting against the restraining member, they prevent levers of groups 21 and 22 from being rotated to the left on shaft 18 by their springs 19. When a bar 14 is attracted by its solenoid 13, the corresponding lever in group 21 or 22 is released to rotate to the left. Each lever passes through a slot 23 in a tab 24 attached to a read-in slide. Thus, a lever released to rotate to the left will pull its slide to the left into active position.

In summary, to move a slide in group 31, for example, to an active position, a key from group 11 is actuated. The key's solenoid 13 attracts its associated bar 14 and releases a lever 21. The selected lever 21 rotates to the left and pulls its associated read-in slide 31 to the left into an active position. Each of the solenoids 13 need only be actuated temporarily. The reason being that the lever 21 when released swings above the bar 14, and thereby prevents the bar from moving back to a blocking position. The movement of the lever and slide to the left is limited by the reset mechanism which is discussed later.

*Read-out mechanism*

With reference to FIG. 1 the read-out mechanism is now discussed in more detail. In order to provide operational members representative of various combinations of operands, stop pins 33 are rotatably mounted on shaft 34. The stop pins are spring biased by hairpin springs 35 and lifted in and out of contact with slides 31, 32, and 50 by means of cam 36. The cam 36 releases the stop pins to pass into the slides during the time which the read-in slides are in an active position. As previously pointed out in the General Description, only one stop pin is passed into the read-out slides by the two groups of read-in slides.

In order to read out the arithmetic calculation, there are two sizes of perforations in the read-out slides. The two sizes of perforations may be seen in FIG. 2. A small perforation 37 penetrated by the stop pin will fix the position of a read-out slide. A large perforation 38 penetrated by the stop pin will permit a read-out slide limited movement to the left. Springs 39 are shown in FIG. 1 providing a force to pull the read-out slides to the left. Upon release by reset pin 77 hereinafter more fully described, the read-out slides which are not held by the stop pin will be pulled to the left by springs 39. The moving slides pull their associated tabs 40 into electrical contacts 41. The pattern of closed electrical contacts represents the result of the arithmetic calculation of the operands.

Note that during the read-in operation, only the operands are required. The desired arithmetic calculation has no part in the selection of the operational member. Accordingly, once the operands have caused the operational member to be selected, any arithmetic calculation may be performed with those operands. In order to perform whatever arithmetic calculation is desired, the read-out slides are divided into three sets of slides for the respective read out of the product, the sum and the difference of the operands read into the system. It is possible to read out the arithmetic result of all of these operations simultaneously. However, if it is desired to read out the results serially, means are provided to select the arithmetic operation to be read out.

Three keys 51, 52, and 53 shown in the right-hand portion of FIG. 1 are provided to select the read-out operation. The keys are mounted on a fixed surface 54 and spring biased by springs 55 upwards. Each key when depressed will be latched by lever 56 which is spring biased against the keys by spring 57. Latching one of the keys in a down position results in the key protruding into the read-out slides through a slot 58 or a hole 59 depending upon the key actuated. The slot 58 and hole 59 arrangement is duplicated in all of the product read-out slides.

In FIG. 4*b* the slot and hole arrangement for the sum and the difference read-out slides is shown. The sum read-out slides are provided with holes 60 under keys 51 and 53 and a slot 61 under key 52. Likewise in the difference read-out slides, holes 63 are provided under keys 51 and 52, and a slot 64 is provided under key 53. Accordingly, if key 51 is depressed and latched, only the product read-out slides will be allowed to move to the left when released by reset pin 77. Similarly, key 52 selects the sum read-out slides for movement to the left, and key 53 selects the difference read-out slides for movement to the left.

In order to understand the inter-relation between the two groups of read-in slides and the three sets of read-out slides in the preferred embodiment reference should be made to FIGS. 4*a* and 4*b*. Each slide is shown as a strip with a single row of perforations and is turned on edge for the purpose of clearly showing the inter-relation between the groups of slides. Comparison of the slides shown in FIG. 1 and in FIGS. 4*a* and 4*b* reveals a difference in configuration in that the perforations in FIG. 1 are in two rows in a zig-zag fashion. The reason for the zig-zag configuration is to shorten the slide and also provide added strength by having more metal between perforations. FIG. 1 represents the practical embodiment; however, for clarity of illustration FIGS. 4*a* and 4*b* are drawn with the perforations in single file.

A study of FIGS. 4*a* and 4*b* reveal the significance of the inter-relation between the two groups of read-in slides and also the inter-relation between the read-in slides and the three sets of read-out slides. The numerals along the top of the upper most slide indicate the operand combinations. The smaller numerals, which are repeated across the top of FIGS. 4*a* and 4*b*, are located over a possible passageway through the slides and correspond to the value of the first operand. The larger numerals bracketing the smaller numerals into areas correspond to the value of the second operand. Numerals 1, 2, 4, and 8 assigned to the keys 11 and 12 in FIG. 1 and all the slides in FIGS. 2, 4*a* and 4*b* indicate the arithmetic value given to each key or slide.

*Operation*

Figure 2:
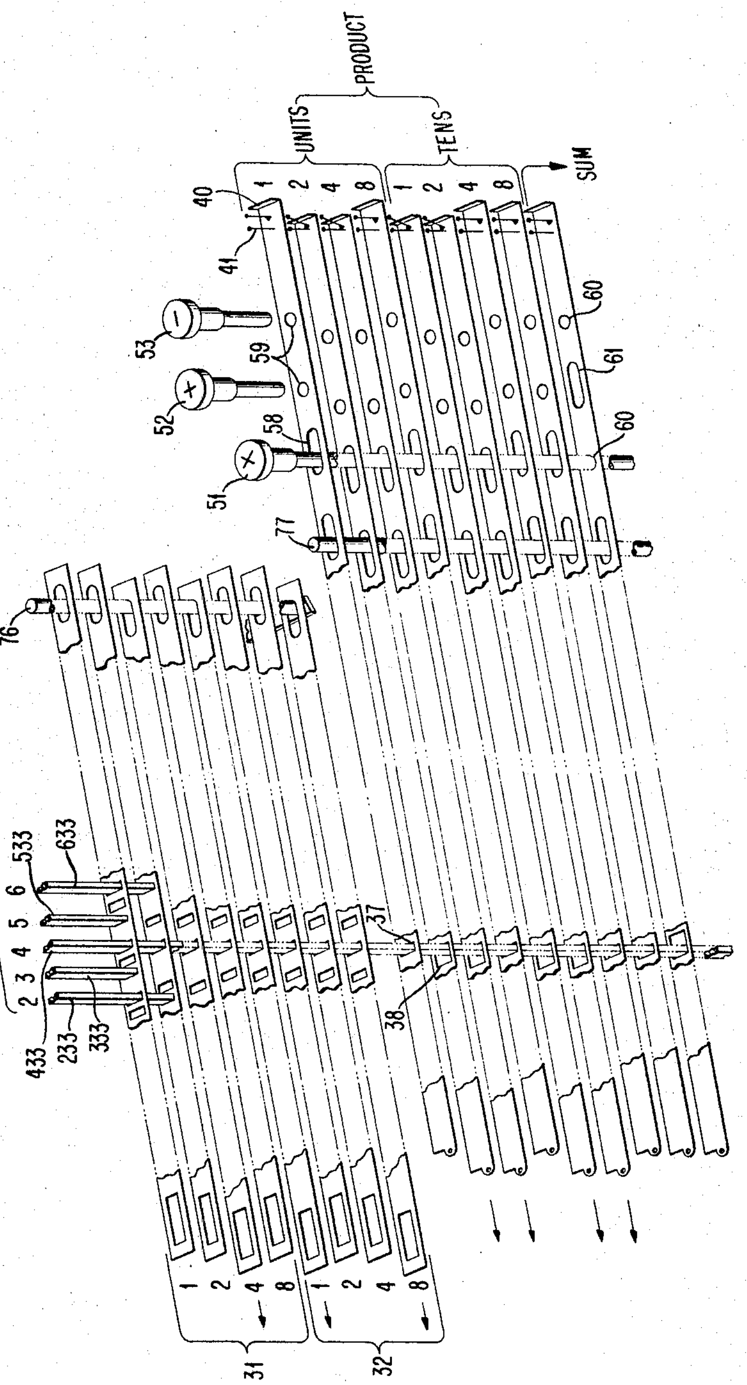
FIG. 2 is an exploded view of a portion of the slides shown in operative position.

In order to illustrate the operation of the preferred embodiment, we shall perform multiplication of a first operand 4 with a second operand 9. Throughout this operative example, reference should be made to FIGS. 1 and 2. FIG. 2 is an exploded, cut-away view of the slides in operative or active position.

To input the first operand into the first group of read-in slides, key 4 in group 11 is temporarily depressed. Its solenoid 13 is actuated and the corresponding lever in group 21 is released to move the 4 slide in group 31 to the left in an active position. To read in the second operand 9, into the second group of read-in slides, keys 1 and 8 of group 12 are temporarily depressed. Their corresponding solenoids 13 will release the corresponding levers in group 22 and thereby position the 1 and 8 slides in group 32 to the left in an active position. The slides are now ready to receive the stop pins 33.

In the cut-away view of FIG. 2 only five stop pins 233, 333, 433, 533, and 633 are shown. These stop pins are shown contacting the slides after having been released by cam 36 in FIG. 1. The five stop pins correspond to positions 2 to 6 in area 9 of the slides (see upper left-hand portion of FIG. 4*b*). Still referring to FIGS. 1 and 2, stop pin 433 represents the combination of a first operand 4 and a second operand 9. Stop pins 233, 333, 533, and 633 are shown blocked by the read-in slides in a manner similar to that for all of the other stop pins 33 except stop pin 433. Note that for stop pin 433 to have successfully passed into the read-out slides, the 4 slide of the first operand group 31 had to be moved to the left as did the 1 and 8 slides of the second operand group 32.

A brief study of FIGS. 4*a* and 4*b* reveal that in this example the first operand group of slides passes the 4 pin in all of the areas 1 to 9. However, the second operand group of slides passes only the 4 pin in area 9. Thus the stop pin representing the combination operand 4 and operand 9 is passed by the two groups of read-in slides.

Having been passed by the two groups of read-in slides, stop pin 433 penetrates the three sets of read-out slides of which only the product read-out set and the first slide of the sum read-out set are shown in FIG. 2. Because only a product read-out is desired in this example, key 51 is depressed and passes through slot 58 in the product read-out slides and hole 60 in the sum read-out slides and hole 63 (see FIG. 4*b*) in the difference read-out slides. As stated previously this permits only the product read-out slides to move to the left during the read-out operation.

With the stop pin 433 in position in the read-out slides, reset pin 77 is given freedom of movement to the left which allows springs 39 shown in FIG. 1 to pull the 2 and 4 slides in the product units position and the 2 and 1 slides in the product 10's position to the left. These slides are pulled to the left because the stop pin penetrates them at a large perforation 38. The remaining product read-out slides are held in a fixed position because the stop pin 433 penetrates them at a small perforation 37. The read-out slides allowed to move by the large perforations 38 cause their tabs 40 to close the electrical contacts 41. Thus, in the product units position the 2 and 4 contacts are closed and in the product 10's position the 1 and 2 contacts are closed. Accordingly, the product of 9 and 4 is 3 in the 10's position and 6 in the units position. With read-out complete, it is now necessary to reset the stop pins and the slides in preparation for the next arithmetic operation.

*Reset mechanism*

The reset mechanism may be seen in FIG. 1 as comprising cams 36, 70, and 71 driven by motor 72. The motor 72 is connected to the shaft 73 by means of a clutch 74. An example of a clutch which might be used is shown in FIG. 2 of Patent 2,978,086, issued to the inventor of the present application and assigned to the same assignee. In that patent, the clutch is described starting at line 57 in column 6.

Cam 36 is used to drop the stop pins into the slides during the read-out operation and to retract them out of the slides during the read-in operation. The high and low dwell timing of cam 36 is shown in FIG. 3. Therein it is indicated that cam 36 is at a high dwell from 180° to 360° of the operative cycle. During this interval the stop pins are lifted out of the slides, and the read-in slides may be reset and repositioned by a new combination of operands.

Cam 71 resets the two groups of read-in slides 31 and 32. As shown in FIG. 3, cam 71 is at a high dwell for a relatively short interval shortly after cam 36 has lifted the stop pins out of the slides. Referring to FIG. 1, it can be seen that the high dwell position for cam 71 will cause rocker arm 75 to rotate and pull the two groups of read-in slides to the right by means of reset pin 76. The read-in slides in turn rotate the levers 21 and 22 to the right. Bars 14 will be lifted back against restraining member 17 when the levers are rotated out of the way. Thus the two groups of read-in slides are reset to an inactive position by the high dwell of cam 71. The high dwell is maintained only for a short time on cam 71, so that the read-in slides will be free to move again when operands are applied to the read-in keys 11 and 12.

The read-out slides 50 are normally held in an inactive position by cam 70. However, cam 70 has a low dwell for a relatively short part of the cycle during the time in which the stop pins are in the slides. At approximately 45° in the cycle cam 70 releases the read-out slides so that they may be moved to active position by springs 39 and thereby read out the arithmetic calculation on the selected operand combination. From approximately 45° to 90° in the cycle, the read-out contacts 41 may be closed by slides 50. Thereafter the high dwell of cam 70 will return the read-out slides to inactive position.

It should be understood that the timing indicated in FIG. 3 is not critical. There are, however, two requirements. First, the read-out slides must be released by cam 70 while the stop pins are in contact with the slides. Second, the stop pins must be dropped into contact with the slides by cam 36 after the read-in slides have been moved to an active position and they must be lifted out of contact with the slides by cam 36 before the read-in slides are reset by cam 71.

In conclusion, it will be appreciated by one skilled in the art that the slides could take on many variations without departing from the invention. A different code other than 1, 2, 4, and 8 might be used. Further, the slides might have a rectangular configuration or a cylindrical configuration rather than the linear-strip configuration shown. It will be further appreciated that there are a great number of input and output means which can be used to position the two groups of read-in slides and detect motion in the read-out slides. Other input and output means might comprise mechanical linkages or electromechanical transducers. In any event, the input and output means are not material to my invention.

At this point it should be very clear in contrasting my invention with the calculators in the prior art that my invention is the essence of mechanical simplicity and requires a minimum of mechanical movement. The speed of execution of arithmetic operations is increased while the cost of manufacture is reduced.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Apparatus for performing an ordered operation with a plurality of operands comprising:

a group of selecting members for each operand in the operation, the selecting members in each group being positioned according to the given character of the group's operand and each selecting member having a pattern of openings;

a plurality of operational members normally retracted but being active to pass into channels formed by the openings in the selecting members when the selecting members have been positioned, each operational member being representative of one combination of characters for the operands;

each group of selecting members, when selecting members in the group have been positioned, forming channels to pass a set of operational members wherein the operational members of the set represent all combinations of the group's given-character operand with all other characters which could be given for the other operands;

each group of selecting members, when selecting members in the group have been positioned, forming in cooperation with the other groups of selecting members a single channel to pass the one operational member which represents the combination of characters given for the operands;

a group of read-out members in proximity to the groups of selecting members, each read-out member having a pattern of multiple-size openings to receive any operational member passed by the groups of selecting members so that those read-out members engaged at a smaller opening by the operational member are limited in movement while those read-out members engaged at a larger opening by the operational member are permitted greater movement; and biasing means to bias said group of read-out members to move after the operational member has passed into the read-out members so that the pattern of movement of the read-out members will indicate the result of an ordered operation performed on the combination of characters given for the operands.

2. Apparatus for simultaneously performing a plurality of ordered operations with a plurality of operands including the apparatus of claim 1 and also including:

a plurality of subgroups of read-out members in said group of read-out members, each subgroup corresponding to one ordered operation and all the subgroups simultaneously engaged by the operational member.

3. Apparatus for performing an ordered operation selected from a plurality of ordered operations which may be performed including the apparatus of claim 1 and also including:

a plurality of subgroups of read-out members in said groups of read-out members, each subgroup corresponding to one ordered operation and all the subgroups simultaneously engaged by the operational members, each subgroup having a distinguishing pattern of identification openings common to the read-out members in the subgroup; and a selecting pin for each ordered operation, each selecting pin normally retracted but being active to pass into the identification openings of the read-out members to select the subgroup of read-out members which may be moved by said biasing means and thereby permitted to read out.

4. Apparatus for performing an ordered operation with a plurality of operands comprising:

a group of slides for each operand in the operation, slides in each group picked according to the given character of the group's operand to be moved into an active position, each slide having a pattern of perforations and all the slides lying in a superposed relationship to each other;

a plurality of operational members normally retracted but being active to pass into passageways formed by the perforations in the slides when the picked slides are in active position, each operational member being representative of one combination of characters for the operands;

each group of slides, when the picked slides are in active position, forming a pattern of passageways to pass a set of operational members wherein the operational members of the set represent all combinations of the group's given-character operand with all other characters which could be given for the other operands;

each group of slides when the picked slides are in active position forming in cooperation with the other groups of slides a single passageway to pass the one operational member which represents the combination of characters given for the operands;

a group of read-out slides in proximity to the groups of slides which select the operational member, each read-out slide having a pattern of multiple-size perforations to receive any operational member passed by the groups of slides which select the operational member so that those read-out slides penetrated at a smaller perforation by the operational member are limited in movement while those read-out slides penetrated at a larger perforation by the operational member are permitted greater movement; and biasing means to bias said group of read-out slides to move after the operational member has passed into the read-out slides so that the pattern of movement of the read-out slides will indicate the result of an ordered operation performed on the combination of characters given for the operands.

5. Apparatus for simultaneously performing a plurality of ordered operations with a plurality of operands including the apparatus of claim 4 and also including:

a plurality of subgroups of read-out slides in said group of read-out slides, each subgroup corresponding to one ordered operation and all the subgroups simultaneously penetrated by the operational member.

6. Apparatus for performing an ordered operation selected from a plurality of ordered operations which may be performed including the apparatus of claim 4 and also including:

a plurality of subgroups of read-out slides in said group of read-out slides, each subgroup corresponding to one ordered operation and all the subgroups simultaneously penetrated by the operational member, each subgroup having a distinguishing pattern of identification perforations common to the read-out slides in the subgroup; and a selecting pin for each ordered operation, each selecting pin normally retracted but being active to pass into the identification perforations of the read-out slides to select the subgroup of read-out slides which may be moved by said biasing means and thereby permitted to read out.

7. Apparatus for performing an ordered operation with two operands comprising:

a first group of perforated slides, each slide parallel to and in vertical alignment with the other slides and slideably positioned according to the character of a first operand;

a second group of perforated slides, each slide parallel to and in vertical alignment with the other slides and also with the slides of said first group and slideably positioned according to the character of a second operand;

a plurality of operational members normally retracted but being active to pass into passageways formed by the vertical alignment of the perforations of said first and said second group of perforated slides, each operational member being representative of one combination of the two characters for the two operands, said plurality of operational members passed into the passageways only after said first and said second group of perforated slides have been slideably positioned;

said first group of slides when slideably positioned forming a pattern of passageways to pass a set of operational members wherein the operational members of the set represent all combinations of the first group's given-character operand with all other characters which could be given for the second operand;

said second group of slides when slideably positioned forming a pattern of passageways which cooperate with the passageways formed by said first group to form a single passageway through both groups to pass one operational member from the set of operational member wherein the one operational member represents the combination of characters given for the two operands;

a group of read-out slides, each slide parallel to and in vertical alignment with the other slides and also with the slides of said first and second group and each slide having a pattern of small and large perforations to receive any operational member passed by said first and second group of slides so that those read-out slides penetrated at a small perforation by the operational member are prevented from moving while those read-out slides penetrated at a large perforation by the operational member are permitted limited movement; and biasing means to bias said group of read-out slides to move after the operational member has passed into the read-out slides so that the pattern of read-out slides that move will indicate the result of an ordered operation performed on the combination of characters given for the two operands.

8. Apparatus for simultaneously performing a plurality of ordered operations with two operands including the apparatus of claim 7 and also including:

a plurality of subgroups of read-out slides in said group of read-out slides, each subgroup corresponding to one order operation and all of the subgroups simultaneously penetrated by the operational member.

9. Apparatus for performing an ordered operation selected from a plurality of ordered operations which may be performed including the apparatus of claim 7 and also including:

a plurality of subgroups of read-out slides in said group of read-out slides, each subgroup corresponding to one ordered operation and all the subgroups simultaneously penetrated by the operational member, each subgroup having a distinguishing pattern of identification perforations common to the read-out slides in the subgroup; and a selecting pin for each ordered operation, each selecting pin normally retracted but being active to pass into the identification perforations of the read-out slides to select the subgroup of read-out slides which may be moved by said biasing means and thereby permitted to read out.

10. Apparatus for simultaneously performing the arithmetic operations of addition, subtraction and multiplication with two operands comprising:

a first group of perforated slides, each slide parallel to and in vertical alignment with the other slides and slidably positioned according to the character of a first operand;

a second group of perforated slides, each slide parallel to and in vertical alignment with the other slides and also with the slides of said first group and slidably positioned according to the character of a second operand;

a plurality of stop pins normally retracted but being active to pass into passageways formed by the vertical alignment of the perforations of said first and said second group of perforated slides, each stop pin being representative of one combination of the two characters for the two operands, said plurality of stop pins passed into the passageways only after said first and said second group of perforated slides have been slidably positioned;

said first group of slides when slidably positioned forming a pattern of passageways to pass a set of stop pins wherein the stop pins of the set represent all combinations of the first group's given character operand with all other characters which could be given for the second operand;

said second group of slides when slidably positioned forming a pattern of passageways which cooperate with the passageways formed by said first group to form a single passageway through both groups to pass one stop pin from the set of stop pins wherein the one stop pin represents the combination of characters given for the two operands;

a group of read-out slides, each slide parallel to and in vertical alignment with the other slides and also with the slides of said first and second group and each slide having a pattern of small and large perforations to receive any stop pin passed by said first and second group of slides so that those read-out slides penetrated at a small perforation by the stop pin are prevented from moving while those read-out slides penetrated at a large perforation by the stop pin are permitted limited movement;

said group of read-out slides including a subgroup of read-out slides for each of the arithmetic operations of addition, subtraction and multiplication, all the subgroups simultaneously penetrated by the stop pin; and biasing means to bias said group of read-out slides to move after the stop pin has passed into the read-out slides so that the pattern of read-out slides that move in each subgroup will indicate the result of the arithmetic operation of the subgroup and thereby the arithmetic operations of addition, subtraction and multiplication are simultaneously performed on the combination characters given for the two operands.

11. Apparatus for performing one arithmetic operation selected from the arithmetic operations of addition, subtraction and multiplication which may be performed comprising:

the apparatus of claim 10 wherein each subgroup of read-out slides has a distinguishing pattern of identification perforations common to the read-out slides in the subgroup; and a selecting pin for each arithmetic operation, addition, subtraction and multiplication, each selecting pin normally retracted but being active to pass into the identification perforations of the read-out slides to select the subgroup of read-out slides which may be moved and thereby to select the read-out of one of the arithmetic operations, addition, subtraction, and multiplication.

References Cited by the Examiner

UNITED STATES PATENTS

| | | | |
|---|---|---|---|
| 2,182,001 | 12/1939 | Peirce | 235—60 |
| 2,185,260 | 1/1940 | Lasker | 235—61 |
| 2,323,824 | 7/1943 | Maschmeyer | 235—61 |
| 2,675,177 | 4/1954 | Perrin | 235—61 |
| 2,774,963 | 12/1956 | Melick | 235—61 |
| 2,904,070 | 9/1959 | Lynott | 235—201 |
| 3,009,633 | 11/1961 | Dilks | 235—61 |

RICHARD B. WILKINSON, *Primary Examiner.*

LEO SMILOW, *Examiner.*

T. J. ANDERSON, *Assistant Examiner.*